March 13, 1934.  S. GORANFLO  1,951,241
DISTILLATION AND PURIFICATION OF FATTY ACIDS
Original Filed Feb. 11, 1932
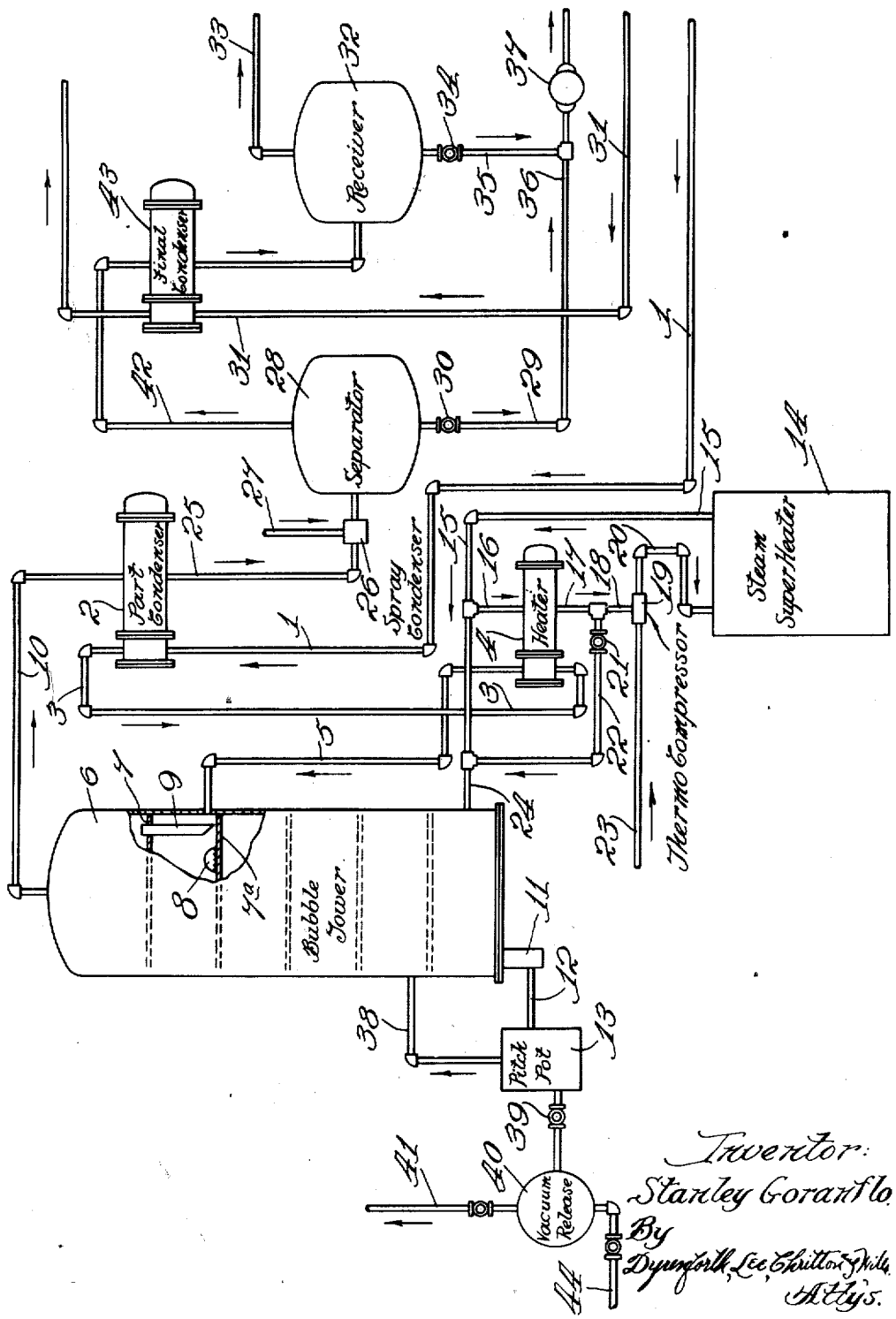
Inventor:
Stanley Goranflo,
By
Dyrenforth, Lee, Chritton & Wiles
Atty's.

Patented Mar. 13, 1934

1,951,241

UNITED STATES PATENT OFFICE 1,951,241

DISTILLATION AND PURIFICATION OF FATTY ACIDS

Stanley Goranflo, Philadelphia, Pa., assignor to Wilson & Co., a corporation of Delaware Continuation of application Serial No. 592,402, February 11, 1932. This application December 12, 1932, Serial No. 646,928

15 Claims. (Cl. 202—53)

This invention relates to improvements in the distillation and purification of fatty acids, and particularly of fatty acids having a boiling point at atmospheric pressure above the decomposition point thereof, for example, oleic, stearic, palmitic and the like, or of mixtures containing the same together with fats or unsaponifiable matter, and will be fully understood from the following description, illustrated by the accompanying drawing, in which apparatus suitable for carrying out the invention is diagrammatically illustrated.

In the distillation of fatty acids or mixtures containing them, in order to recover the fatty acids as distillates, as heretofore conducted, there are serious losses in the proportions of the fatty acids recovered, and a marked degradation of the undistilled residue. In general, in order to secure a high-grade fatty acid product, it has been necessary to re-distill the fatty acids recovered in such operation, this re-distillation being accompanied by a further loss. When subjected to high vacuum steam distillation in accordance with processes hitherto in use, the yield of fatty acid distillate in the first distillation is 80 to 85% and on re-distillation, the yield is 76% of the original stock. Such losses in the distillation operation, and degradation of the products have persisted, notwithstandng the development of the use of high vacuums, and of steam, in the operation.

Moreover, in previous operations, a distillate of relatively poor color and odor has been produced. By means of this invention the temperature and the time of operation and vapor velocities have been so coordinated as to produce a high yield of a substantially odorless distillate of remarkable color.

In carrying out the invention, a suitable fatty acid-containing stock, for example, the mixture derived by splitting the fats of a commercial grease or oil by any suitable process such as the Twitchell process, is charged from a suitable source through the line 1. Such a mixture, in ordinary practice, may contain 92 to 96% free fatty acids.

The fatty acid-containing stock is passed rapidly through the line 1, preferably while warm, say from 100 to 150° F. and under a head sufficient to produce rapid flow into and through the partial condenser or heat exchanger 2 where the stock is heated by the vapors from the still or bubble tower 6. Preferably, the arrangement of the heat exchanger and the rate of flow is such that the charge is raised therein to a temperature of, say, 250°-400° F., and preferably about 350° F.

at an average rate of, say, 5-40° per minute, and preferably about 15° per minute. The stock then passes through the line 3 into the heater 4, where it is rapidly heated by superheated steam to a vaporization temperature of, say, 440-590° F. and preferably from 475-500° F. This heating may be at a rate of say 5-100° per minute. In general, the more rapid the heating, barring local overheating, the better the result. The stock is then passed through line 5 into the still 6, in this instance a bubble tower. The speed of passage through the pipes should be enough to produce turbulent flow.

This pre-heating need not be carried out in two stages and the rate of heating below, say, 400° is not as important as the rate of heating beyond this point.

The fatty acid upon entering into the atmosphere of reduced pressure in the still, loses its temperature due to the expansion and to the evaporation. This drop is normally about 50° F. It is preferred to retain the unevaporated fatty acid in the still on the average as short a time as possible. For example, in a bubble tower having a capacity of 650 lbs. of liquid it is preferred to retain the unevaporated fatty acids on an average of about 20-40 minutes. During this time they are heated at a rate of about 5-15° per minute, preferably at about 8-10° per minute.

The still or tower 6 is provided with a plurality of bubble plates 7, which are fitted with bubble caps 8 and overflow pipes 9. The stock is preferably introduced upon an intermediate upper plate 7ª, having a temperature and fatty acid content about that of the stock, in this instance, the next to the top plate. In order to facilitate further the distillation, a partial vacuum of, say, 18 to 27 inches of mercury, and preferably about 20-24 inches may be maintained in the tower 6. The extent of the vacuum desired will depend in part upon the amount and temperature of steam which it is desired to use.

Normally a pressure difference of about one to two inches should be maintained between the top and bottom of the still. For example with a top vacuum of 24", the vacuum in the bottom of the still should be 22-23" in a tower containing 5 bubble plates and having a height of approximately 15 feet.

The heated fatty acid-containing stock, upon entering the tower 6 is deposited upon the plate 7ª, where it is met by a current of superheated steam rising through the tower, and is partially vaporized. The vapors rise through the bubble cap or caps in the upper plate 7, where a pool of substantially pure fatty acids is soon built up and maintained. The uncondensed fatty acid vapors pass off with the steam through the line 10.

The unvaporized stock upon each plate collects until it overflows through the overflow pipes 9 and runs onto the next succeeding lower plate, and so passes gradually down the tower until, after leaving the final plate, the unvaporized stock may be drawn out through the trap 11 and the outlet 12 into the pitch or bottoms pot 13. After its original drop in temperature, the stock during its progress down the tower gradually rises in temperature and continually falls in fatty acid content. A temperature of 575–675° F. and normally 620–630° F. is maintained in the lower portion of the tower.

The steam used in the tower or still is heated in the superheater 14 from which it passes through the pipe 15, and from which it may be directed into the heater 4 and into the tower 6. The relative proportions going to the heater and the tower may be determined by any suitable means, for example, a manifold (not shown). The steam passed into the heater through the line 16 may then be returned to the superheater through the lines 17, 18 and 20 and the thermocompressor 19, or may be directed into the tower by means of the valve 21 in line 22.

In practice, it is preferable to introduce to the superheater through the line 23 and the thermocompressor 19, plant steam in an amount equal to that used in the bubble tower 6, the remaining steam being merely recirculated through the heater. In practice, about two to three times as much steam is required for the heater as will be required in the tower under the conditions of temperature and pressure herein set forth.

The steam leaving the superheater is preferably under a pressure of, say, 2–4 lbs., and a temperature of 590–850° F. and preferably 725–775° F., whereas it may be returned to the superheater from the heater 4 at a temperature of, say, 400–500° F., and preferably 450–475° F., and a pressure of 2–4 lbs. The plant steam may be introduced at any available temperature and pressure, but preferably under high temperature and pressure, for example, a pressure of 75–90 lbs.

The steam is introduced into the tower through the line 24 at such a rate as to maintain a temperature of approximately 590–660° F. in the lower part of the tower, and rises through the tower in a stream counter-current to the flow of the fatty acid-containing stock, carrying with it the fatty acid vapors. The amount and temperature of the steam may of course be adjusted to secure substantially complete vaporization of the fatty acids, and in practice it has been found that where the fatty acid-containing stock enters the tower at about 480° to 520° F., an amount and temperature of steam sufficient to secure a bottom temperature of 600° F. is satisfactory. For other initial stock temperatures the bottom temperature may also be varied.

The mingled steam and fatty acid vapors pass up the tower 6 through the bubble plates, counter-current to the descending stream of acid-containing stock, and finally pass off through the line 10. The temperature at the top of the tower is maintained at as low a point as will insure a good yield and an economical use of steam, say, from 370° F. upwards, and preferably about 435–450° F.

The amount of steam and charging stock introduced into the bubble tower should be so controlled as to maintain a low vapor velocity therein. Under a vacuum of 20–24″, a vapor velocity of 4 feet per second or less is preferred, and particularly a velocity of 1½ to 2 feet per second. At such velocities the bubble plates prove to be extremely good entrainment breakers or preventors. For example, with a good grade of stock a distillate having a color of 1 to 1½ N. P. A. may readily be produced, while with even the poorest types of garbage grease acids distillates having a color rating of 2 or better may be produced with a single distillation. N. P. A. indicates the National Petroleum Association standard of colors and is well known to those skilled in the art.

The vapors pass through the line 10 into the partial condenser or heat exchanger 2 where they serve to pre-heat the incoming stock and are themselves cooled about 50° F., and the incoming stock is heated to about 350° F. From the partial condenser 2 the acid and steam are passed through the line 25 to the spray condenser 26 where the vapors are cooled by the admission of water through the line 27, the vapors being cooled to a temperature above the boiling point of water under the vacuum present, but below that at which any substantial fatty acid vapor pressure exists, as, for example, under a 26 or 27 inch vacuum to a temperature in the neighborhood of 180–275° F., and preferably about 200° F. The mingled liquids and vapors pass to the separator 28, from which the condensed fatty acids may be removed through the line 29 by means of a valve 30. The uncondensed acid and steam is passed through the line 42 to the final condenser 43 where the vapors are cooled to a temperature of 135–165° F., say, 150° F., by means of water or other cooling fluid introduced through the line 31. The mingled liquid and vapors are passed to a receiver 32 from which the steam is removed through the line 33 and may be passed to a barometric condenser, if desired. The condensed fatty acids may be pumped from the receiver by the pump 37 through the valve 34 and the line 35 into the line 36, where they join the liquid flowing from the separator. The condensation of the acids in the presence of water has a beneficial effect upon the color of the acids produced, and is highly desirable. The vacuum on the final receiver may be in the neighborhood of 28–30″, that on the condenser in such event being from 26–28″.

A vacuum may be obtained by a suitable pump (not shown) on the line 33. The bottoms from the pitch pot may be recycled through the line 38 into a lower plate of the bubble tower 6, or may be withdrawn through the valve 39 and a vacuum release 40 from which any vapors may be removed through the line 41 and the residue withdrawn through the line 44.

By carrying out the bulk of the condensation of the fatty acids at a temperature above the boiling point of water and below the boiling point of the acids, a number of advantages are achieved. In the first place, the absence of substantial quantities of liquid water prevents the emulsification of the acid which was always present in previous practice. Secondly, it has been discovered that the odoriferous portions of the distillate are steam-soluble and are carried away by the steam, thereby producing an odorless distillate. If the water were permitted to condense with the acids, such odoriferous products would likewise be condensed and they subsequently remain in the acids despite the separation of the water. This method is particularly valuable in combination with a quick-heating method wherein no decomposition odors are produced. In the process as described, substantially all of the fatty acids are condensed in the initial condenser and practically none in the receiver 32. The acids produced contain just a trace of water.

It is likewise important to withdraw continuously the bottoms from the pitch pot. These bottoms have a remarkable tendency to atomize or foam and entrain themselves in the distillate. Unless they are removed continuously and substantially completely as formed, it is extremely difficult to prevent their coming over with the distillate.

As an example of operation under the process hereinbefore described, the following distillation was carried out. The still or bubble tower in the operation to be described had a height of approximately 15 feet, an average cross-sectional area at the top of 30.6 feet (a diameter of 6 feet 3"), contained 5 bubble plates spaced 2 feet 6" apart, the bottom plate being approximately 2 feet above the still bottom.

The four topmost plates each had a capacity of 125 lbs. of liquid while the bottom plate had a diameter of about 6" less than the upper plates, due to an inset in the tank, and had a capacity of about 118 lbs. of liquid. In addition, a cup was provided below the bottom plate into which liquid from the plate drained and this had a capacity of 38 lbs. of liquid. Steam was admitted to the tower below the bottom plate through a 6" pipe. Stock was admitted on to the next to the top plate through a 2" pipe and vapors were removed from the top of the tower through an 8" vapor line. The stock fed into the system was under a pressure in excess of atmospheric.

During a continuous run of 90 hours the still was charged with 129,039 pounds of pan stock containing 95% free fatty acids, or at a rate of 1434 lbs. per hour. 116,394 pounds of distillate was recovered, having a color of 1¾ N. P. A. and representing a yield of 90.2%.

During this period of 89,760 pounds of steam was introduced to the tower at a temperature of approximately 750° F., on the average, fluctuations occurring during the period from 735-775° F. The stock was introduced to the system at a temperature of approximately 150° F., was heated in the partial condenser to a temperature of 335-350° F., with a normal temperature of 340°-345° F.; it was then heated in the heater 4 to 475-495° F., the normal temperature being 480-485° F.; the charge was then introduced into the still upon the next to the top tray of the tower, where it was dropped about 50° in temperature so that the temperature below the plate was 435-450° F. and normally 435-440° F. The stock descending in the tower gradually rose in temperature until the bottom temperature was 615-645° F. and was normally 625-630° F. The vapors rising in the tower had an exit temperature of 435-445° F., and normally were about 440° F. The vapors were cooled to 280-285° F. in the separator, although a range of 270-300° F. was observed. The temperature of 135-140° F. was maintained in the receiver with maximum variations from 125-185° F. The temperature of the water entering the separator was 65° F. and the temperature of the water after passing therethrough was about 115° F. on the average. During this period steam was taken from the plant line at a pressure of 71-95 pounds, with 80-85 pounds normal; the steam passing to the superheater had a pressure of 6 to 7 pounds while that leaving the superheater had a pressure of 4-5 pounds.

A vacuum of 22-24" was maintained in the bottom of the tower. The vacuum in the top of the tower was 24-26", with 1 to 2 inches difference from the pressure in the bottom of the tower. The vacuum in the separator was 26-28"; that in the receiver was 28-30". It is understood that a substantially uniform pressure gradient was maintained regardless of the particular vacuum at any position.

The partial condenser had a capacity of approximately 285 pounds of liquid and this is likewise true of the superheater. The capacity of the piping between the partial condenser and the super-heater was about 14 lbs., while the capacity of the piping from the superheater to the bubble tower was approximately 10 lbs.

The rate of heating in the partial condenser was therefore about 15° per minute, and that in the superheater was about 10° per minute.

The bubble tower had a liquid capacity of 656 lbs., and was estimated to contain about 500 lbs. of fatty acids, or about 375 lbs., excluding the top plate, which was substantially all pure fatty acid. On this basis the acids remained about 23 minutes in the still on the average. This stock was therefore heated at the rate of about 12° per minute.

The process may likewise be used to strip fatty acid-containing oils of their fatty acids and at the same time to deodorize them. For example, palm oil, cocoanut oil and the like may readily be passed through the system and have removed therefrom their free fatty acid content. For example, a palm oil containing approximately 13.54% free fatty acids may be reduced to .8% fatty acids on one pass through the still, while producing a distillate of extremely good color.

The distillate acids have a somewhat greater iodine number than ordinary factory distillate obtained from the same stock. Moreover, in spite of the increased yield of fatty acids over ordinary distillation, the percentage of fatty acids remaining in the bottoms is considerably increased.

The foregoing detailed description has been given for clearness of understanding only, and no unnecessary limitations should be understood therefrom, but the appended claims should be construed as broadly as permissible, in view of the prior art.

This application is a continuation of my copending application Serial No. 592,402, filed February 11, 1932.

I claim:

1. The method of distilling higher fatty acids from fatty acid-containing stock which comprises: heating said stock to a volatilization temperature while passing said stock in a restricted stream through a heating zone; discharging said stock upon an intermediate upper plate of a bubble tower; allowing said stock to descend said tower countercurrent to a stream of superheated steam; passing the uncondensed vapors from each plate through the bodies of liquid in the plates above such vapors; removing the uncondensed vapors above the final plate at a velocity of 4 feet per second or less and condensing the fatty acids from such vapors.

2. The method of distilling higher fatty acids from fatty acid-containing stock which comprises: heating said stock from a temperature below 200° F. to a temperature of approximately 350° F. at a rate of 5-40° per minute; further heating said stock from 350° F. to 475-525° F. at an average rate of from 5-100° F. per minute; maintaining a succession of liquid bodies of fatty acid-containing stock progressively higher in temperature and lower in fatty acid content; discharging said fatty acid-containing stock into an upper liquid body lower in temperature and fatty acid content than said stock; passing the overflow from each liquid body into a lower liquid body counter-current to a current of superheated steam while maintaining a rate of flow such that said fatty acid-containing stock shall not remain in said succession of liquid bodies longer than an average of one hour; passing the evolved fatty acid vapors upwardly through said liquid bodies, removing entrained matter therefrom; and removing and condensing said vapors.

3. The method as set forth in claim 2, in which the temperature of said fatty acid-containing stock does not exceed 600° F.

4. The method as set forth in claim 2, in which the uncondensed vapors are removed at a temperature of 370-450° F.

5. The method of distilling a higher fatty acid from stock containing it, which comprises rapidly heating the stock to a volatilizing temperature, while passing it in a restricted stream through a heating zone, discharging the stock under subatmospheric pressure into a liquid body of higher fatty-acid-containing stock, successively passing the overflow from said body into other liquid bodies progressively higher in temperature and lower in fatty acid content, simultaneously passing superheated steam through and in intimate and direct contact with said liquid bodies counter current to the flow of the stock whereby the steam in its passage removes practically all of the fatty acid content of the stock, removing entrained matter from the stream of mixed steam and acid vapor at a point, in the direction of travel of the vapor stream, beyond the body to which the stock is fed and removing and condensing the fatty acid vapors.

6. The method of claim 5 in which the removal of entrained matter is accomplished by maintaining a body of condensed acid at a point, in the direction of travel of the vapors, beyond the body into which the stock is introduced, passing the steam and acid vapors through and in direct and immediate contact with said body of condensed acid and returning the overflow from said body of condensed acid to one of the liquid bodies through which the vapor stream has previously passed.

7. The method of claim 5 in which the undistilled residue is promptly removed from the path of the steam.

8. The method of claim 5 in which the stock is introduced at a temperature of 470°-520° F.

9. The method of claim 5 in which the vapors are removed at 370°-450° F.

10. The method of claim 5 in which the stock remains in the liquid bodies on an average of 20-60 minutes.

11. The method of claim 5 in which the stock is introduced at a temperature of 470°-520° F., the vapors are removed at 370°-450° F. and the stock remains in the liquid bodies an average of 20-60 minutes.

12. The method as set forth in claim 5, in which said vapors are removed at a velocity corresponding to a rate of 1½ to 2 feet per second for a vacuum of 22 inches of mercury.

13. The method as set forth in claim 5, in which said vapors are removed at a velocity corresponding to a rate not substantially greater than 4 feet per second for a vacuum of 22" of mercury.

14. In the process of distilling a higher fatty acid from stock containing it under a vacuum and in a current of steam, the steps of condensing substantially all of the acid vapors at a temperature above the boiling point of water at the prevailing pressure while adding liquid water in a quantity sufficient to leave a trace of liquid water in the condensed acid and removing the condensed acid from the steam.

15. The method of claim 14 in which the acid vapors are condensed at a temperature of 180°-275° F. at an absolute pressure of zero to six inches of mercury.

STANLEY GORANFLO.

DISCLAIMER 1,951,241.—*Stanley Goranflo*, Philadelphia, Pa. DISTILLATION AND PURIFICATION OF FATTY ACIDS. Patent dated March 13, 1934. Disclaimer filed February 16, 1940, by the assignee, *New Process Fat Refining Corporation*.

Hereby enters this disclaimer to claims 1, 5, 6, 7, 8, 9, 12, and 13 in said patent.

[*Official Gazette March 5, 1940.*]

an average rate of from 5-100° F. per minute; maintaining a succession of liquid bodies of fatty acid-containing stock progressively higher in temperature and lower in fatty acid content; discharging said fatty acid-containing stock into an upper liquid body lower in temperature and fatty acid content than said stock; passing the overflow from each liquid body into a lower liquid body counter-current to a current of superheated steam while maintaining a rate of flow such that said fatty acid-containing stock shall not remain in said succession of liquid bodies longer than an average of one hour; passing the evolved fatty acid vapors upwardly through said liquid bodies, removing entrained matter therefrom; and removing and condensing said vapors.

3. The method as set forth in claim 2, in which the temperature of said fatty acid-containing stock does not exceed 600° F.

4. The method as set forth in claim 2, in which the uncondensed vapors are removed at a temperature of 370-450° F.

5. The method of distilling a higher fatty acid from stock containing it, which comprises rapidly heating the stock to a volatilizing temperature, while passing it in a restricted stream through a heating zone, discharging the stock under subatmospheric pressure into a liquid body of higher fatty-acid-containing stock, successively passing the overflow from said body into other liquid bodies progressively higher in temperature and lower in fatty acid content, simultaneously passing superheated steam through and in intimate and direct contact with said liquid bodies counter current to the flow of the stock whereby the steam in its passage removes practically all of the fatty acid content of the stock, removing entrained matter from the stream of mixed steam and acid vapor at a point, in the direction of travel of the vapor stream, beyond the body to which the stock is fed and removing and condensing the fatty acid vapors.

6. The method of claim 5 in which the removal of entrained matter is accomplished by maintaining a body of condensed acid at a point, in the direction of travel of the vapors, beyond the body into which the stock is introduced, passing the steam and acid vapors through and in direct and immediate contact with said body of condensed acid and returning the overflow from said body of condensed acid to one of the liquid bodies through which the vapor stream has previously passed.

7. The method of claim 5 in which the undistilled residue is promptly removed from the path of the steam.

8. The method of claim 5 in which the stock is introduced at a temperature of 470°-520° F.

9. The method of claim 5 in which the vapors are removed at 370°-450° F.

10. The method of claim 5 in which the stock remains in the liquid bodies on an average of 20-60 minutes.

11. The method of claim 5 in which the stock is introduced at a temperature of 470°-520° F., the vapors are removed at 370°-450° F. and the stock remains in the liquid bodies an average of 20-60 minutes.

12. The method as set forth in claim 5, in which said vapors are removed at a velocity corresponding to a rate of 1½ to 2 feet per second for a vacuum of 22 inches of mercury.

13. The method as set forth in claim 5, in which said vapors are removed at a velocity corresponding to a rate not substantially greater than 4 feet per second for a vacuum of 22″ of mercury.

14. In the process of distilling a higher fatty acid from stock containing it under a vacuum and in a current of steam, the steps of condensing substantially all of the acid vapors at a temperature above the boiling point of water at the prevailing pressure while adding liquid water in a quantity sufficient to leave a trace of liquid water in the condensed acid and removing the condensed acid from the steam.

15. The method of claim 14 in which the acid vapors are condensed at a temperature of 180°-275° F. at an absolute pressure of zero to six inches of mercury.

STANLEY GORANFLO.

---

DISCLAIMER 1,951,241.—*Stanley Goranflo*, Philadelphia, Pa. DISTILLATION AND PURIFICATION OF FATTY ACIDS. Patent dated March 13, 1934. Disclaimer filed February 16, 1940, by the assignee, *New Process Fat Refining Corporation*.

Hereby enters this disclaimer to claims 1, 5, 6, 7, 8, 9, 12, and 13 in said patent.
[*Official Gazette March 5, 1940.*]